United States Patent
Kato et al.

(10) Patent No.: US 12,534,699 B2
(45) Date of Patent: Jan. 27, 2026

(54) **METHOD FOR PROMOTING GROWTH OF BACTERIA OF GENUS *BIFIDOBACTERIUM***

(71) Applicant: KABUSHIKI KAISHA YAKULT HONSHA, Minato-ku (JP)

(72) Inventors: Kosuke Kato, Minato-ku (JP); Kaoru Tochiya, Minato-ku (JP); Takekazu Okumura, Minato-ku (JP)

(73) Assignee: KABUSHIKI KAISHA YAKULT HONSHA, Minato-ku (JP)

( * ) Notice: Subject to any disclaimer, the term of this patent is extended or adjusted under 35 U.S.C. 154(b) by 767 days.

(21) Appl. No.: 17/621,305

(22) PCT Filed: Jun. 24, 2020

(86) PCT No.: PCT/JP2020/024692
§ 371 (c)(1),
(2) Date: Dec. 21, 2021

(87) PCT Pub. No.: WO2020/262414
PCT Pub. Date: Dec. 30, 2020

(65) Prior Publication Data
US 2022/0356439 A1 Nov. 10, 2022

(30) Foreign Application Priority Data
Jun. 25, 2019 (JP) .................. 2019-117361

(51) Int. Cl.
*C12N 1/20* (2006.01)
*A23C 9/123* (2006.01)
*A23C 9/146* (2006.01)

(52) U.S. Cl.
CPC ............... *C12N 1/20* (2013.01); *A23C 9/123* (2013.01); *A23C 9/146* (2013.01); *A23V 2400/51* (2023.08)

(58) Field of Classification Search
CPC .. C12N 1/38; C12N 1/20; A23C 9/123; A23C 9/1234; A23C 9/146; A23V 2400/51
USPC .......................................................... 426/43
See application file for complete search history.

(56) References Cited

U.S. PATENT DOCUMENTS

| 6,063,935 A | 5/2000 | Masuda et al. |
| 2004/0052902 A1 | 3/2004 | Shimakawa et al. |
| 2009/0155860 A1 | 6/2009 | Goulas et al. |

FOREIGN PATENT DOCUMENTS

| CN | 107805656 A | 3/2018 |
| EP | 3 928 625 A1 | 12/2021 |
| JP | 11-269142 A | 10/1999 |
| JP | 2008-237224 A | 10/2008 |
| JP | 2009-514543 A | 4/2009 |

(Continued)

OTHER PUBLICATIONS

Extended European Search Report issued Sep. 27, 2023 in European Patent Application No. 20832070.5, 16 pages.

(Continued)

*Primary Examiner* — Subbalakshmi Prakash
(74) *Attorney, Agent, or Firm* — Oblon, McClelland, Maier & Neustadt, L.L.P.

(57) ABSTRACT

Provided a method for promoting growth of bacteria of the genus *Bifidobacterium*. The method for promoting growth of bacteria of the genus *Bifidobacterium* includes subjecting a milk culture medium containing one or more selected from the group consisting of cysteine, cystine, and a salt thereof to heat treatment and then culturing bacteria of the genus *Bifidobacterium* in the milk culture medium.

14 Claims, 10 Drawing Sheets

(56) References Cited

FOREIGN PATENT DOCUMENTS

JP          2017-066087 A     4/2017
WO    WO 2012/011174 A1    1/2012

OTHER PUBLICATIONS

Turhan et al., "Fractionation of Caseins by Anion-exchange Chromatography Using Food-grade Buffers", Journal of Food Science, vol. 68, No. 5, Jun. 1, 2003, pp. 1578-1583 (total 7 pages), XP93082850.

International Search Report issued Sep. 8, 2020 in PCT/JP2020/024692, filed on Jun. 24, 2020, 3 pages.

Dave et al. "Effect of Cysteine on the Viability of Yoghurt and Probiotic Bacteria in Yoghurts Made with Commercial Starter Cultures", International Dairy Journal, vol. 7, Issues 8-9, 1997, pp. 537-545.

Bolduc et al. "Sensitivity of bifidobacteria to oxygen and redox potential in non-fermented pasteurized milk", International Dairy Journal, vol. 16, Issue 9, 2006, pp. 1038-1048.

Sugiura et al. "Studies on cystine containing medium for enumeration of Bifidobacterium", Bulletin of Osaka Prefectural Institute of Public Health, vol. 27, 1989, pp. 101-105 (with Partial English Translation).

Nakashima "Effects of Amino Acids on the Acid Production of Lactic Acid Bacteria Added to Skim Milk", Journal of Home Economics of Japan, vol. 47(11), 1996, pp. 1085-1091.

Partial Supplementary European Search Report issued May 25, 2023, in corresponding European Patent Application No. 20832070.5, 14 pages.

Roy D., et al., "Growth requirements of Bifidobacterium strains in milk", Milchwissenschaft, vol. 45, No. 8, 1990, 3 pages.

METHOD FOR PROMOTING GROWTH OF BACTERIA OF GENUS *BIFIDOBACTERIUM*

TECHNICAL FIELD

The present invention relates to a method for promoting growth of bacteria of the genus *Bifidobacterium*.

BACKGROUND ART

Cysteine is one of the non-essential amino acids, constitutes protein naturally in the form of L-cysteine, and is biosynthesized from methionine in vivo in human beings. L-Cysteine has effects, such as an antioxidative effect, an effect of inhibiting melanin pigment production, and an effect of detoxifying acetaldehyde produced by alcohol metabolism, and is used in the field of foods, cosmetics, pharmaceuticals, etc. focusing on its whitening effect and hangover alleviating effect.

Cystine is an amino acid in which two cysteine molecules are oxidized and bonded via a disulfide bond. Cystine is slightly soluble in water and is easily reduced to cysteine. Naturally, cystine constitutes protein in the form of L-cystine and is abundantly contained in keratin of, in particular, hair, nails, etc.

It has been known that cysteine or cystine is added to a growth medium for bacteria of the genus *Bifidobacterium* (Non Patent Literature 1). They are amino acids essential for the growth of bacteria of the genus *Bifidobacterium*, and cysteine reduces redox potential. Accordingly, cysteine and cystine are thought to be components suitable for the growth of bacteria of the genus *Bifidobacterium* which are sensitive to oxygen or hydrogen peroxide. It has also been reported that cysteine is added to milk to reduce the redox potential for increasing viability of bifidobacteria during storage (Non Patent Literature 2). However, the addition of cysteine or cystine to a growth medium for bacteria of the genus *Bifidobacterium* is merely for the purpose of supplementing an amino acid and reducing the redox potential.

CITATION LIST

Non Patent Literature

Non Patent Literature 1: Rajiv I. Dave & Nagendra P. Shah, International Dairy Journal, Volume 7, Issues 8-9, 1997, pp. 537-545

Non Patent Literature 2: Marie-Pierre Bolduc, et al., International Dairy Journal, Volume 16, Issue 9, 2006, pp. 1038-1048

SUMMARY OF INVENTION

Technical Problem

It is an object of the present invention to provide a method that can simply and efficiently promote growth of bacteria of the genus *Bifidobacterium*.

Solution to Problem

The present inventors made various studies in view of the above problems and, as a result, found that in culture of bacteria of the genus *Bifidobacterium* in a milk culture medium, the growth of the bacteria is promoted by adding cysteine, cystine, or a salt thereof to the milk culture medium, subjecting the medium to heat treatment, and then culturing the bacteria of the genus *Bifidobacterium* in the milk culture medium, compared to the culture using a culture medium prepared by subjecting a milk culture medium and cysteine, cystine, or salt thereof individually to heat treatment and mixing them. It is inferred that this is because a substance generated by a reaction between a component of a milk culture medium and cysteine, cystine, or a salt thereof by simultaneously heating the milk culture medium and cysteine, cystine, or a salt thereof works as a growth-promoting agent for the bacteria of the genus *Bifidobacterium*. Accordingly, the present inventors variously studied to clarify such a growth-promoting agent and found that a milk culture medium component obtained by isolating components having molecular weights of less than 3,000 from a heated product of a milk culture medium containing cysteine, cystine, or a salt thereof, allowing the components to be retained on an anion exchange resin at a pH of 8.0 or higher, and further eluting a component retained on the anion exchange resin in the presence of anions at a specific concentration shows an effect of promoting the growth of bacteria of the genus *Bifidobacterium*. The present inventors have accomplished the present invention based on these findings.

That is, the present invention provides the following [1] to [13].

[1] A method for promoting growth of bacteria of the genus *Bifidobacterium*, comprising subjecting a milk culture medium containing one or more selected from the group consisting of cysteine, cystine, and a salt thereof to heat treatment and then culturing bacteria of the genus *Bifidobacterium* in the milk culture medium.

[2] The method according to [1], wherein the heat treatment is performed at 60 to 125° C. for 10 to 40 minutes.

[3] The method according to [1] or [2], wherein the milk culture medium contains one or more selected from the group consisting of L-cysteine, L-cystine, and a salt thereof.

[4] The method according to any one of [1] to [3], wherein the milk culture medium contains L-cysteine hydrochloride.

[5] A method for producing fermented milk, comprising subjecting a milk culture medium containing one or more selected from the group consisting of cysteine, cystine, and a salt thereof to heat treatment and then culturing bacteria of the genus *Bifidobacterium* in the milk culture medium.

[6] Fermented milk obtained by the method of [5].

[7] A growth-promoting agent for bacteria of the genus *Bifidobacterium*, comprising a heat-treated product obtained by heat treatment of a milk culture medium containing one or more selected from the group consisting of cysteine, cystine, and a salt thereof as an active component.

[8] The growth-promoting agent according to [7], wherein the heat treatment is performed at 60 to 125° C. for 10 to 40 minutes.

[9] The growth-promoting agent according to [7] or [8], wherein the milk culture medium contains one or more selected from the group consisting of L-cysteine, L-cystine, and a salt thereof.

[10] The growth-promoting agent according to any one of [7] to [9], wherein the milk culture medium contains L-cysteine hydrochloride.

[11] The growth-promoting agents according to any one of [7] to [10], wherein the heat-treated product is a component having a molecular weight of less than 3,000 of the heat-treated milk culture medium, wherein the component is retained on an anion exchange resin at a pH of 8.0 or higher and is eluted from the anion exchange resin in the presence of 1 to 400 mM anions.

[12] A milk culture medium component, having a molecular weight of less than 3,000 of a heat-treated milk culture medium that contains one or more selected from the group consisting of cysteine, cystine, and a salt thereof, wherein the component is retained on an anion exchange resin at a pH of 8.0 or higher and is eluted from the anion exchange resin in the presence of 1 to 400 mM anions.

[13] A method for producing a milk culture medium component, comprising subjecting a milk culture medium containing one or more selected from the group consisting of cysteine, cystine, and a salt thereof to heat treatment, isolating components having molecular weights of less than 3,000 from the resulting heat-treated product of the milk culture medium, allowing the obtained components to be retained on an anion resin at a pH of 8.0 or higher, and further eluting a component retained on the anion resin in the presence of 1 to 400 mM anions.

Advantageous Effects of Invention

According to the present invention, growth of bacteria of the genus *Bifidobacterium* can be simply and efficiently promoted by subjecting a milk culture medium containing one or more selected from the group consisting of cysteine, cystine, and a salt thereof to heat treatment and then culturing bacteria of the genus *Bifidobacterium* in the milk culture medium, and the culture time can be shortened. Such a method for promoting growth of bacteria of the genus *Bifidobacterium* is also useful as a method for producing fermented milk. In addition, a component isolated from the heat-treated product of a milk culture medium containing one or more selected from the group consisting of cysteine, cystine, and a salt thereof under specific conditions is useful as a growth-promoting agent for bacteria of the genus *Bifidobacterium*.

DESCRIPTION OF EMBODIMENTS

Figure 1:
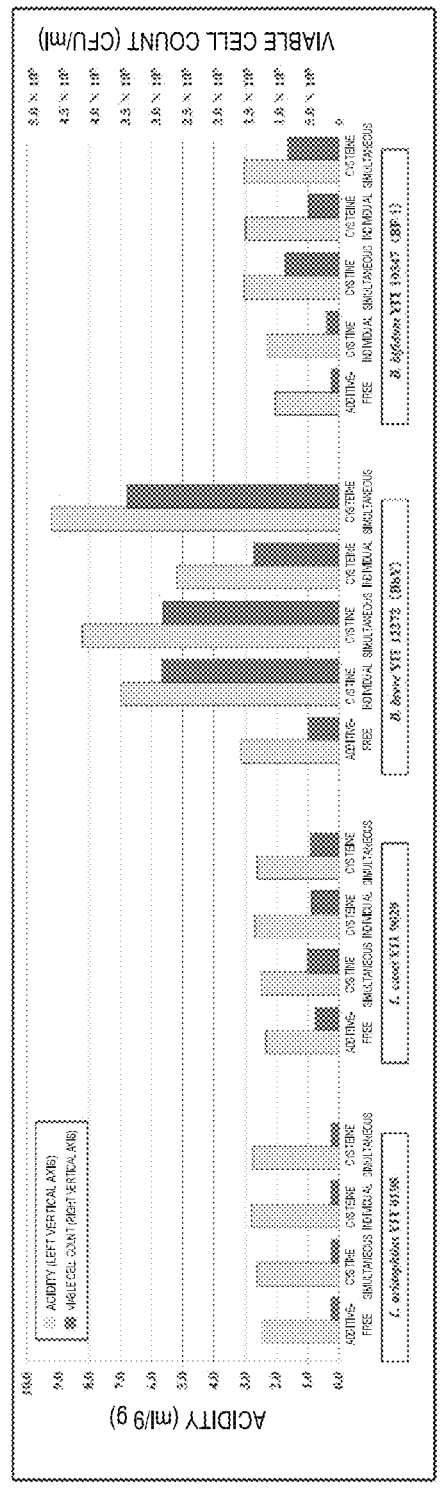
FIG. 1 is graphs showing proliferation properties of *Lactobacillus* strains and *Bifidobacterium* strains when milk and L-cystine or L-cysteine hydrochloride are simultaneously or individually heated.

The method for promoting growth of bacteria of the genus *Bifidobacterium* of the present invention is characterized by subjecting a milk culture medium containing one or more selected from the group consisting of cysteine, cystine, and a salt thereof to heat treatment and then culturing bacteria of the genus *Bifidobacterium* in the milk culture medium.

The type of the bacteria of the genus *Bifidobacterium* used in the present invention is not particularly limited, and examples thereof include *Bifidobacterium breve*, *Bifidobacterium longum*, *Bifidobacterium bifidum*, *Bifidobacterium animalis*, *Bifidobacterium suis*, *Bifidobacterium infantis*, *Bifidobacterium adolescentis*, *Bifidobacterium catenulatum*, *Bifidobacterium pseudocatenulatum*, *Bifidobacterium lactis*, and *Bifidobacterium globosum*. Among these, *Bifidobacterium breve*, *Bifidobacterium longum*, and *Bifidobacterium bifidum* are preferred because they have been used in many dairy products since before and data on the safety, etc. have been accumulated, and *Bifidobacterium breve* and *Bifidobacterium bifidum* are more preferred. Specifically, *Bifidobacterium breve* YIT 12272 (FERM BP-11320) and *Bifidobacterium bifidum* YIT 10347 (FERM BP-10613) are particularly preferred.

The culture medium that is used in the present invention for growth of bacteria of the genus *Bifidobacterium* is a milk culture medium. Here, the milk culture medium is not particularly limited as long as the main component of the culture medium is milk. Examples of the milk include milk (whole milk) and processed products thereof, such as skimmed milk, casein-free whey, whey-derived ingredients, and milk-derived peptides. The whey-derived ingredients are preferably water-soluble proteins contained in the whey (whey proteins), specifically, for example, β-lactoglobulin and α-lactalbumin. The milk culture medium is preferably a skimmed milk culture medium or a whey culture medium. The non-fat milk solid content and the fat content can be arbitrarily set by varying the milk raw material to be used and the amount thereof. The milk culture medium may contain a growth factor for bacteria of the genus *Bifidobacterium*, such as a yeast extract.

The cysteine or the cystine used in the present invention may be of natural origin or may be a product of a chemical synthesis method, a fermentation method, or a gene recombination method. As the cysteine or the cystine, although any of L-form, D-form, and DL-form can be used, the L-form is preferred. The salt of cysteine or cystine may be any pharmaceutically acceptable salt, and examples thereof include salts with alkali metals (such as sodium and potassium), salts with alkaline earth metals (such as calcium and magnesium), ammonium salts, salts with inorganic acids (such as hydrochloric acid, hydrobromic acid, sulfuric acid, nitric acid, and phosphoric acid), and salts with organic acids (such as acetic acid, propionic acid, tartaric acid, fumaric acid, maleic acid, succinic acid, malic acid, and citric acid). Among these examples, from the viewpoint of safety and ease of handling, L-cysteine hydrochloride and L-cystine, which are food additives, are preferred, and L-cysteine hydrochloride is more preferred. The cysteine, cystine, and salts thereof may be used alone or in combination of two or more.

The content of one or more selected from the group consisting of cysteine, cystine, and a salt thereof (hereinafter, referred to as cysteine or the like) in a milk culture medium is not particularly limited, and from the viewpoint of the growth-promoting effect, the content is preferably 0.001 to 0.1 (w/v) %, more preferably 0.001 to 0.05 (w/v) %, and further preferably 0.005 to 0.05 (w/v) % as the final concentration. Cysteine or the like is added to a milk culture medium before heat treatment. The addition method is not particularly limited, and cysteine or the like may be directly added to a milk culture medium, or a solution of cysteine or the like (e.g., an aqueous solution) may be added to a milk culture medium, so as to give the above-mentioned final concentration.

In the method for promoting growth of bacteria of the genus Bifidobacterium of the present invention, a milk culture medium containing cysteine or the like is subjected to heat treatment. The means of the heat treatment is not particularly limited, and examples thereof include an autoclave. The heating temperature is preferably 60 to 125° C., more preferably 64 to 121° C., further preferably 100 to 121° C., and further preferably 115 to 121° C. The heating time is preferably 10 to 40 minutes, more preferably 15 to 30 minutes, and further preferably 20 to 30 minutes. Alternatively, the heat treatment may be performed so as to satisfy a thermal history (the total amount of heat added) or a heat sterilization strength that is equivalent to the above-described heat treatment conditions. The temperature of the heat-treated milk culture medium may be lowered to the culture temperature or below by, for example, leaving it to stand or using a cooling device by the time of culturing.

Subsequently, bacteria of the genus Bifidobacterium are inoculated into the heat-treated milk culture medium and are cultured. For the culture of bacteria of the genus Bifidobacterium, normal culturing conditions may be applied as they are. That is, the culture may be performed by appropriately setting various conditions, such as the inoculation amount, temperature, time, and culture atmosphere, to be suitable for bacteria of the genus Bifidobacterium that are inoculated into the culture medium. For example, the inoculation amount may be 0.01 to 5%, preferably 0.1 to 1%, the culture temperature may be 25 to 46° C., preferably 35 to 42° C., and the culture time may be 6 to 120 hours, preferably 24 to 72 hours. In addition, although the culture atmosphere may be aerobic conditions or may be anaerobic conditions, culture under anaerobic conditions is preferred. The culture method is not particularly limited, and, for example, any of standing, stirring, and shaking may be selected.

Bacteria of the genus Bifidobacterium can be cultivated efficiently in a short time in a milk culture medium by the method for promoting growth of bacteria of the genus Bifidobacterium of the present invention. Accordingly, the method is also useful as a method for producing fermented milk containing bacteria of the genus Bifidobacterium.

Fermented milk as a cultured product of bacteria of the genus Bifidobacterium obtained by the method of the present invention can be produced into a final product by addition of an arbitrary ingredient, such as syrup (sweetener). Examples of the syrup include saccharides, such as glucose, sucrose, fructose, fructose-glucose syrup, glucose-fructose syrup, Palatinose, trehalose, lactose, xylose, maltose, honey, and molasses; sugar alcohols, such as sorbitol, xylitol, erythritol, lactitol, Palatinit, reduced sugar syrup, and reduced maltose starch syrup; and high-intensity sweeteners, such as aspartame, thaumatin, sucralose, acesulfame K, and stevia. In addition, the fermented milk may be mixed with an emulsifier, such as sucrose fatty acid ester, glycerin fatty acid ester, polyglycerin fatty acid ester, sorbitan fatty acid ester, and lecithin; and a thickener (stabilizer), such as agar, gelatin, carrageenan, guar gum, xanthan gum, pectin, locust bean gum, gellan gum, carboxymethyl cellulose, a soybean polysaccharide, and propylene glycol alginate. In addition to them, the fermented milk can be mixed with, for example, vitamins, such as vitamin A, vitamin Bs, vitamin C, vitamin D, and vitamin Es; minerals, such as calcium, magnesium, zinc, iron, and manganese; an acidulant, such as citric acid, lactic acid, acetic acid, malic acid, tartaric acid, and gluconic acid; milk fat, such as cream, butter, and sour cream; flavors, such as yogurt, berry, orange, karin (Chinese quince), perilla, citrus, apple, mint, grape, apricot, pear, custard cream, peach, melon, banana, tropical, herb, tea, and coffee flavors; a herbal extract; or a brown sugar extract.

A fermented milk product may be produced by a usual procedure. For example, fermented milk is homogenized to obtain a fermented milk base, a syrup solution separately prepared is then added to and mixed with the base, the mixture is homogenized with, for example, a homogenizer, and a flavor is further added thereto to obtain a final product. As the fermented milk product, beverages and food are included, and the fermented milk product may be a product in any form, such as a plain type not containing syrup (sweetener), a soft type, a fruit flavor type, a solid form, or a liquid form.

As shown in Examples below, growth of bacteria of the genus Bifidobacterium can be promoted by culturing the bacteria using a milk culture medium that contains cysteine or the like and is subjected to heat treatment. The mechanism for this is inferred that a substance generated by a reaction between a milk culture medium component and cysteine or the like by simultaneous heat treatment of the milk culture medium and the cysteine or the like contributes to promoting the growth of bacteria of the genus Bifidobacterium. Accordingly, the heat-treated product of a milk culture medium containing cysteine or the like can be used as a growth-promoting agent for bacteria of the genus Bifidobacterium. Examples of the heat treatment conditions include the above-described conditions. Since cysteine or the like is an amino acid, a protein or a peptide is assumed as the milk culture medium component that reacts with cysteine or the like.

As shown in Examples below, the milk culture medium component exhibiting an effect of promoting the growth of bacteria of the genus Bifidobacterium in the heat-treated product of a milk culture medium containing cysteine or the like is more specifically a component having a molecular weight of less than 3,000 contained in the heat-treated product of the milk culture medium, and is a milk culture medium component that is retained on an anion exchange resin at a pH of 8.0 or higher and is eluted from the anion exchange resin in the presence of 1 to 400 mM, preferably 50 to 200 mM, anions.

Such a milk culture medium component can be produced by subjecting a milk culture medium containing cysteine or the like to heat treatment, isolating components having molecular weights of less than 3,000 from the resulting milk culture medium, allowing the obtained components to be retained on an ion exchange resin at a pH of 8.0 or higher, and then eluting a component retained on the ion exchange resin in the presence of 1 to 400 mM, preferably 50 to 200 mM, anions.

Here, the content of cysteine or the like in the milk culture medium when the heat-treated product is obtained is not particularly limited, and is, as a final concentration, preferably 0.001 to 1 (w/v) %, more preferably 0.001 to 0.5 (w/v) %, further preferably 0.001 to 0.1 (w/v) %, further preferably 0.001 to 0.05 (w/v) %, and particularly preferably 0.005 to 0.05 (w/v) % from the viewpoint of production efficiency. Cysteine or the like is added to a milk culture medium before heat treatment. The addition method is not particularly limited, and cysteine or the like may be directly added to a milk culture medium, or a solution of cysteine or the like (e.g., an aqueous solution) may be added to a milk culture medium, so as to give the above-mentioned final concentration.

Examples of the heat treatment conditions include the above-described conditions. Specifically, the heating temperature is preferably 60 to 125° C., more preferably 64 to 121° C., further preferably 100 to 121° C., and further preferably 115 to 121° C. The heating time is preferably 10 to 40 minutes, more preferably 15 to 30 minutes, and further preferably 20 to 30 minutes. Alternatively, the heat treatment may be performed so as to satisfy a thermal history (the total amount of heat added) or a heat sterilization strength that is equivalent to the above-described heat treatment conditions.

Subsequently, components having molecular weights of less than 3,000 are isolated from the resulting heat-treated product of the milk culture medium. Here, the isolation means based on molecular weight may be a known means, such as ultrafiltration and gel filtration chromatography. For example, when ultrafiltration is used, an ultrafiltration filter with a molecular weight cutoff of about 3 kDa may be used to collect the filtrate. The molecular weights of the obtained components can be verified by SDS-polyacrylamide gel electrophoresis.

Subsequently, the obtained components having molecular weights of less than 3,000 are adjusted to a pH of 8.0 or higher, preferably a pH of 8.0, with, for example, hydrochloric acid, and are brought into contact with an anion exchange resin to retain a desired component on the anion exchange resin. The pH is adjusted for negatively charging the desired component and allowing the component to adsorb to the anion exchange resin.

Here, the material, structure, and so on of the anion exchange resin are not particularly limited and can be appropriately selected. Examples of the resin matrix of the anion exchange resin include a styrene resin, an acrylic resin, and an agarose resin. Examples of the resin structure of the anion exchange resin include a gel type, a porous type, and a high porous type. Examples of the functional group of the anion exchange resin include a primary amino group, a secondary amino group, a tertiary amino group, and a quaternary ammonium group. The anion exchange resin may be a strongly basic anion exchange resin or may be a weakly basic anion exchange resin, and is preferably a strongly basic anion exchange resin from the viewpoint of the separation ability.

As such an anion exchange resin, a commercial product may be used, and examples thereof include, as a strongly basic anion exchange resin, DIAION (registered trademark) series SA10A, SA12A, SA11A, NSA100, UBA120, PA306S, PA308, PA312, PA316, PA318L, HPA25, SA20A, SA21A, PA408, PA412, and PA418 (manufactured by Mitsubishi Chemical Corporation) and Q Sepharose (registered trademark) High Performance and Q Sepharose Fast Flow (manufactured by GE Healthcare Japan Corporation) and include, as a weakly basic anion exchange resin, DIAION (registered trademark) series WA10, WA20, WA21J, and WA30 (manufactured by Mitsubishi Chemical Corporation) and DEAE Sepharose Fast Flow (manufactured by GE Healthcare Japan Corporation). The anion exchange resin is preferably equilibrated in advance with a buffer solution having a buffering capacity at a pH of 8.0 (for example, Tris buffer solution).

The method for contact with the anion exchange resin may be of a batch type or a column type, and a column type method is preferred from the viewpoint of efficiency. In the column type method, a solution containing the components having molecular weights of less than 3,000 of the heat-treated product of a milk culture medium obtained above may be allowed to pass through a column filled with an anion exchange resin. Subsequently, a sufficient amount of a buffer solution having a buffering capacity at a pH of 8.0 (for example, Tris buffer solution) may be allowed to pass through the column to rinse off the substances that have not adsorbed to the anion exchange resin. Here, the column capacity and flow rate are not particularly limited and may be appropriately selected considering, for example, the sample amount and the retention capacity of the anion exchange resin. The column capacity is, for example, 1 to 20 mL, preferably 5 to 20 mL, and the flow rate is, for example, 0.1 to 20 mL/min, preferably 1 to 10 mL/min. Such conditions may be appropriately changed according to the purification amount.

As the column filled with an anion exchange resin, a commercial product may be used, and examples thereof include, as a column filled with a strongly basic anion exchange resin, HiTrap (registered trademark) Q FF and HiPrep (registered trademark) Q FF (manufactured by GE Healthcare Japan Corporation) and include, as a column filled with a weakly basic anion exchange resin, HiTrap DEAE FF (manufactured by GE Healthcare Japan Corporation).

The component retained on the anion exchange resin is eluted in the presence of 1 to 400 mM, preferably 50 to 200 mM, anions. Here, the type of the anion is not particularly limited, and examples thereof include $Cl^-$ ions. Specifically, a buffer solution with a pH of 8.0 (for example, Tris buffer solution) containing 1 to 400 mM, preferably 50 to 200 mM, NaCl may be allowed to pass through the anion exchange resin, and the eluate may be collected. The flow rate in elution is also not particularly limited and may be appropriately selected considering, for example, the retention capacity of the anion exchange resin. The flow rate is, for example, 0.1 to 20 mL/min, preferably 1 to 10 mL/min. Such conditions may be appropriately changed according to the purification amount. The obtained eluate may be used by being directly added to a culture medium or may be used after being subjected to a known procedure, such as concentration or dilution, according to the purpose. The thus eluted milk culture medium component can promote the growth of bacteria of the genus *Bifidobacterium*, as shown in Examples below.

A method for producing a milk culture medium component as a growth-promoting agent of the present invention will now be described in detail using examples, but the present invention is not limited thereto.

A whey culture medium containing cysteine or the like at a final concentration of 0.001 to 1 (w/v) % is heated at 115° C. for 30 minutes. The resulting heat-treated product of the whey culture medium is allowed to pass through an ultra-filtration membrane with a molecular weight cutoff of 3 kDa to collect components of molecular weights of less than 3,000 as the filtrate. The pH of the collected filtrate is adjusted to 8.0 with hydrochloric acid. Separately, a 20 mM Tris buffer solution having a pH of 8.0 is allowed to pass through an anion exchange column (for example, HiTrap Q FF (manufactured by GE Healthcare Japan Corporation)) for equilibration. The pH-adjusted filtrate is allowed to pass through the equilibrated anion exchange column to retain a desired component on the anion exchange column. The substances that have not adsorbed to the anion exchange column are rinsed off by allowing a sufficient amount of a 20 mM Tris buffer solution to pass through the anion exchange column. Subsequently, a Tris buffer solution with a pH of 8.0 containing 50 to 200 mM of NaCl is allowed to pass through the column to collect the eluate. When a liquid chromatography apparatus is used for collecting a desired milk culture medium component from the anion exchange column, for example, a fraction with an elution volume of 22 to 28 mL may be collected in the following conditions:

Column: HiTrap Q FF 1 mL;
Starting buffer: 20 mM Tris buffer solution (pH 8.0);
Elution buffer: 20 mM Tris buffer solution (pH 8.0) containing 1 M NaCl;
Elution method: Flowthrough 20 CV, gradient (0→100%, 20 CV), 2 mL/fraction, wash (100%, 5 CV);
Application method: Direct sample load 10 mL;
Flow rate: 1 mL/min;
Column temperature: room temperature; and
Equipment: AKTA explorer (GE Healthcare).

EXAMPLES

The present invention will now be described in further detail with reference to Examples, but the present invention is not limited to them.

Example 1: Growth-Promoting Effect by Simultaneous Heating of Milk and Cystine or Cysteine (1) Test Bacterial Strain

*Bifidobacterium breve* YIT 12272 (hereinafter, referred to as BbY), *Bifidobacterium bifidum* YIT 10347 (hereinafter, referred to as BF-1), *Lactobacillus casei* YIT 9029 (hereinafter, referred to as YIT 9029), and *Lactobacillus acidophilus* YIT 0198 (hereinafter, referred to as YIT 0198) were used.

(2) Preparation of Culture Medium
(i) Skimmed Milk Culture Medium

A skimmed milk powder (ABC, manufactured by MEG-MILK SNOW BRAND Co., Ltd.) was dissolved in RO water at 12% (w/v), the solution was dispensed in 10 mL aliquots in a rimmed medium-sized test tube while replacing the headspace with nitrogen gas and sealed with a butyl rubber stopper. Subsequently, the solution was sterilized by heat in an autoclave (SX-500, manufactured by Tomy Seiko Co., Ltd.) at 115° C. for 30 minutes to provide a skimmed milk culture medium (additive-free culture medium). In addition, a skimmed milk culture medium (simultaneous heating culture medium) was prepared in anaerobic conditions by adding an L-cystine (manufactured by Kyowa Hakko Bio Co., Ltd.) aqueous suspension or an L-cysteine hydrochloride (manufactured by Nichiri Kagaku Co., Ltd.) aqueous solution to a skimmed milk culture medium at a final concentration of 0.05 (w/v) % and performing heat sterilization after the addition of the suspension or the solution, and a skimmed milk culture medium (individual heating culture medium) was prepared in anaerobic conditions by adding the suspension or the solution to a skimmed milk culture medium at a final concentration of 0.05 (w/v) % after heat sterilization and immediately before inoculation. Here, the L-cystine aqueous suspension and the L-cysteine hydrochloride aqueous solution were prepared as a 5% (w/v) aqueous suspension and a 5% (w/v) aqueous solution, respectively, and were added to each culture medium at an amount of 1% (v/v). In order to unify the changes in the concentration and the changes in the redox potential of samples due to the addition of the solution, 1% (v/v) of sterilized water was added to the simultaneous heating culture medium immediately before inoculation, to the individual heating culture medium before heating, and to the additive-free culture medium before heating and immediately before inoculation, i.e., twice.

(3) Inoculation and Culture Conditions

When bacteria were inoculated, inoculation was performed while replacing the headspace of the container with nitrogen gas, and the nitrogen gas was sealed with a butyl rubber stopper, followed by culture. The culture was performed in a thermostat water bath set to 37° C. for 12 hours.

(4) Method for Measuring Various Parameters
(i) pH

The pH of a culture medium or a bacterial solution was measured using a desk-top pH meter (F52, manufactured by HORIBA, Ltd.).

(ii) Acidity

The amount of a 0.1 N sodium hydroxide aqueous solution for 9.0 g of a bacterial solution required to reach a pH of 8.5 was defined as acidity. The measurement was performed using an automatic titrator (manufactured by HIRANUMA Co., Ltd.).

(iii) Viable Cell Count

Regardless of the bacterial strain, a bacterial solution was appropriately diluted with a 0.85% (w/v) sodium chloride aqueous solution (physiological saline solution). The diluted bacterial solution was inoculated with a spiral plater EDDY JET (manufactured by IUL Instruments GmbH) on a plate culture medium of TOS propionate agar medium (manufactured by Yakult Pharmaceutical Industry Co., Ltd.) in the case of bacteria of the genus *Bifidobacterium* and a plate culture medium of BCP Added Plate Count medium (manufactured by EIKEN CHEMICAL CO., LTD.) in the case of bacteria of the genus *Lactobacillus*, followed by culture at 37° C. for 48 to 72 hours. The grown colonies were counted as the viable cell count. The bacteria of the genus *Lactobacillus* were cultured in aerobic conditions, and the bacteria of the genus *Bifidobacterium* were cultured in anaerobic conditions (Anaero Pack, manufactured by MITSUBISHI GAS CHEMICAL COMPANY, INC.). Colonies were counted using a colony counter ProtoCOL (manufactured by Synoptics Ltd.).

(5) Results

FIG. 1 shows proliferation properties of each bacterial strain when skimmed milk and L-cystine or L-cysteine hydrochloride (hereinafter, referred to as L-cysteine) were simultaneously or individually heated.

In the two strains of the genus *Lactobacillus* (YIT 0198 and YIT 9029), growth promotion by addition of L-cystine or L-cysteine was not observed, and there was no difference by the variation in timing of addition of L-cysteine.

Figure 2:
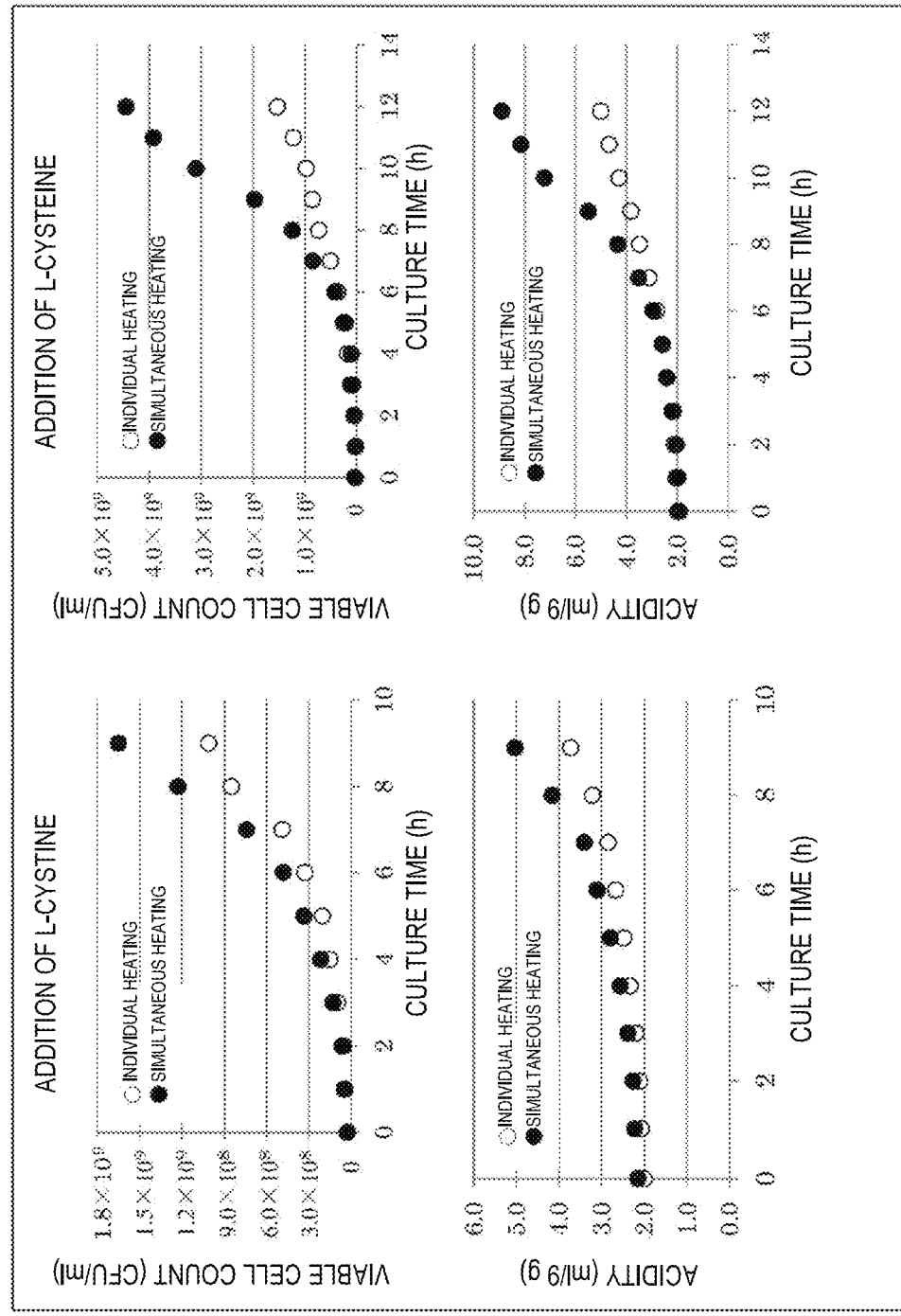
FIG. 2 is graphs of growth curves of a *Bifidobacterium* strain when milk and L-cystine or L-cysteine hydrochloride are simultaneously or individually heated.

In contrast, when BbY, a strain of the genus *Bifidobacterium*, was cultured in the presence of L-cystine for 12 hours, the acidity and the viable cell count were increased 2.2 to 2.6 times and 5.6 times, respectively, compared to those in the absence of L-cystine. In addition, when L-cystine was heated together with milk, after culturing for 12 hours, although the viable cell count was the same as that in the case of the individual heating, the acidity was 1.3 mL/9 g higher. Thus, in the conditions of sufficiently long culture time, even though the viable cell counts are similar in a sufficiently high state (e.g., $10^9$ CFU/mL or more), a higher acidity can be judged as having a higher proliferation level. This is because the viable cell count of bacteria having higher proliferation properties reaches its peak first, and then the viable cell count of bacteria having lower proliferation properties catches up. Accordingly, the growth curve of BbY when L-cystine or L-cysteine was added at a final concentration of 0.03% (w/v) was examined by a test independent from the test shown in FIG. 1, and as shown in FIG. 2, it was demonstrated that the growth rate of the viable cell count is higher in the case of the simultaneous heating, and the increment in the acidity also increases along with it.

Similarly, also when BF-1, a strain of the genus *Bifidobacterium*, was cultured in the presence of L-cystine for 12 hours, the acidity and the viable cell count were increased 1.1 to 1.5 times and 1.7 to 7.7 times, respectively, compared to those in the absence of L-cystine. When L-cystine was heated together with milk, the acidity was 1.3 times higher and also the viable cell count was 4.5 times higher than those in the case of the individual heating.

For the two strains of the genus *Bifidobacterium*, similar experiments were performed three times, and all results showed the same tendency. Accordingly, it was suggested that the growth-promoting effect when skimmed milk and L-cystine or L-cysteine were simultaneously heated is specific to bacteria of the genus *Bifidobacterium*.

Even when L-cysteine, which is easily soluble in water, is added instead of L-cystine, since promotion of growth was observed by simultaneous heating with milk, as in L-cystine (FIGS. 1 and 2), it was suggested that the increase in the amount of dissolved L-cystine by heating is not a main factor of the growth-promoting action.

As shown in Table 1 below, no difference in the culture state of BbY was observed between when L-cysteine was heated alone and was then added to milk at a final concentration of 0.03% (w/v) (individual heating) and when L-cysteine was sterilized through a filter of 0.22 μm without heating and was then added to milk at a final concentration of 0.03% (w/v) (filter sterilization). Accordingly, the possibility that the growth-promoting effect of L-cysteine was attenuated by heating is denied.

TABLE 1

| L-cysteine addition method | Culture time 9 h | | | Culture time 12 h | | |
|---|---|---|---|---|---|---|
| | pH | Acidity (ml/9 g) | Viable cell count (CFU/ml) | pH | Acidity (ml/9 g) | Viable cell count (CFU/ml) |
| No addition | 5.83 | 2.61 | $5.17 \times 10^8$ | 5.62 | 2.94 | $5.15 \times 10^8$ |
| Individual heating | 5.42 | 3.59 | $7.77 \times 10^8$ | 5.02 | 5.04 | $1.78 \times 10^9$ |
| Filter sterilization | 5.40 | 3.62 | $8.92 \times 10^8$ | 4.94 | 5.12 | $1.64 \times 10^9$ |
| Simultaneous heating | 5.17 | 4.47 | $1.34 \times 10^9$ | 4.64 | 8.05 | $3.46 \times 10^9$ |

Example 2: Influence of Cystine or Cysteine Addition Concentration on Bacterial Culture State (1) Test Bacterial Strain
BbY and BF-1 were used.
(2) Preparation of Culture Medium
(i) Skimmed Milk Culture Medium As in Example 1, each simultaneous heating culture medium of milk and L-cystine or L-cysteine was prepared. The addition concentration of L-cystine or L-cysteine was adjusted to 0.001, 0.003, 0.005, 0.01, 0.03, 0.05, or 0.1% (w/v) as the final concentration.

(ii) Whey Culture Medium Separated Before Heating

A skimmed milk powder was dissolved in RO water at 12% (w/v), and the 12% (w/v) skimmed milk was adjusted to a pH of 4.6 with 5 N HCl, followed by centrifugation at 3,000×g for 5 minutes. Subsequently, the supernatant was adjusted to a pH of 6.5 with 5 N NaOH and was centrifuged at 10,000×g for 15 to 30 minutes. The supernatant was dispensed in 10 mL aliquots in a rimmed medium-sized test tube while replacing the headspace with nitrogen gas and sealed with a butyl rubber stopper. Subsequently, the supernatant was sterilized by heat in an autoclave at 115° C. for 30 minutes to provide a whey culture medium separated before heating. In addition, as in the skimmed milk culture medium, simultaneous heating culture medium was prepared in anaerobic conditions by adding L-cystine or L-cysteine before heating and then performing heat sterilization. The addition concentration of L-cystine or L-cysteine was adjusted to 0.001, 0.003, 0.005, 0.01, 0.03, 0.05, or 0.1% (w/v) as the final concentration.

(3) Inoculation and Culture Conditions

Inoculation and culture were performed as in Example 1 except that only when BbY was cultured in the skimmed milk culture medium, the culture time was 9 hours.

(4) Method for Measuring Various Parameters

The (i) pH, (ii) acidity, and (iii) viable cell count were measured as in Example 1.

(5) Results

Figure 3:
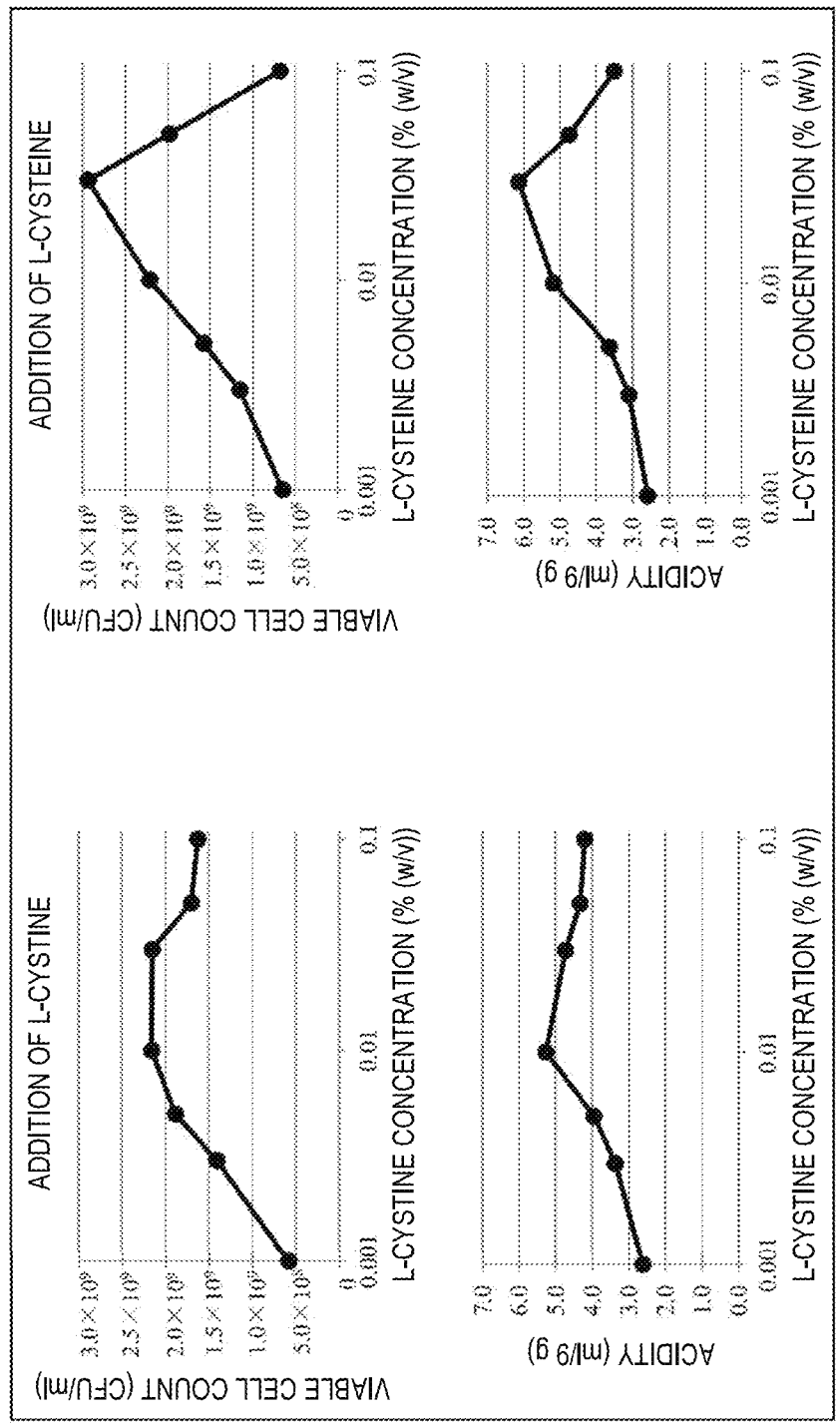
FIG. 3 is graphs showing differences in the culture state of *Bifidobacterium breve* YIT 12272 (BbY) due to differences in the concentration of L-cystine or L-cysteine hydrochloride added to a skimmed milk culture medium.
Figure 4:
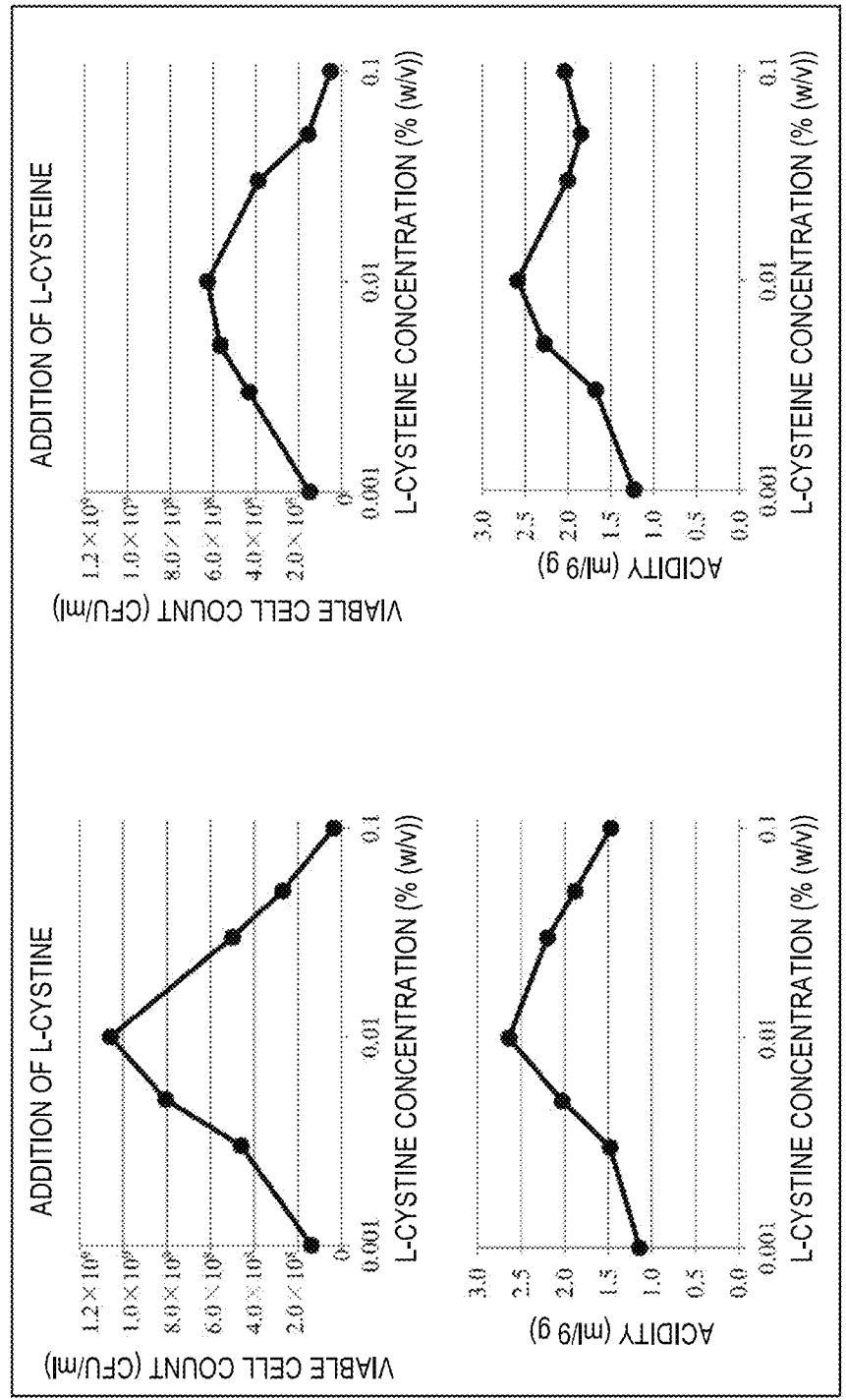
FIG. 4 is graphs showing differences in the culture state of BbY due to differences in the concentration of L-cystine or L-cysteine hydrochloride added to a whey culture medium.
Figure 5:
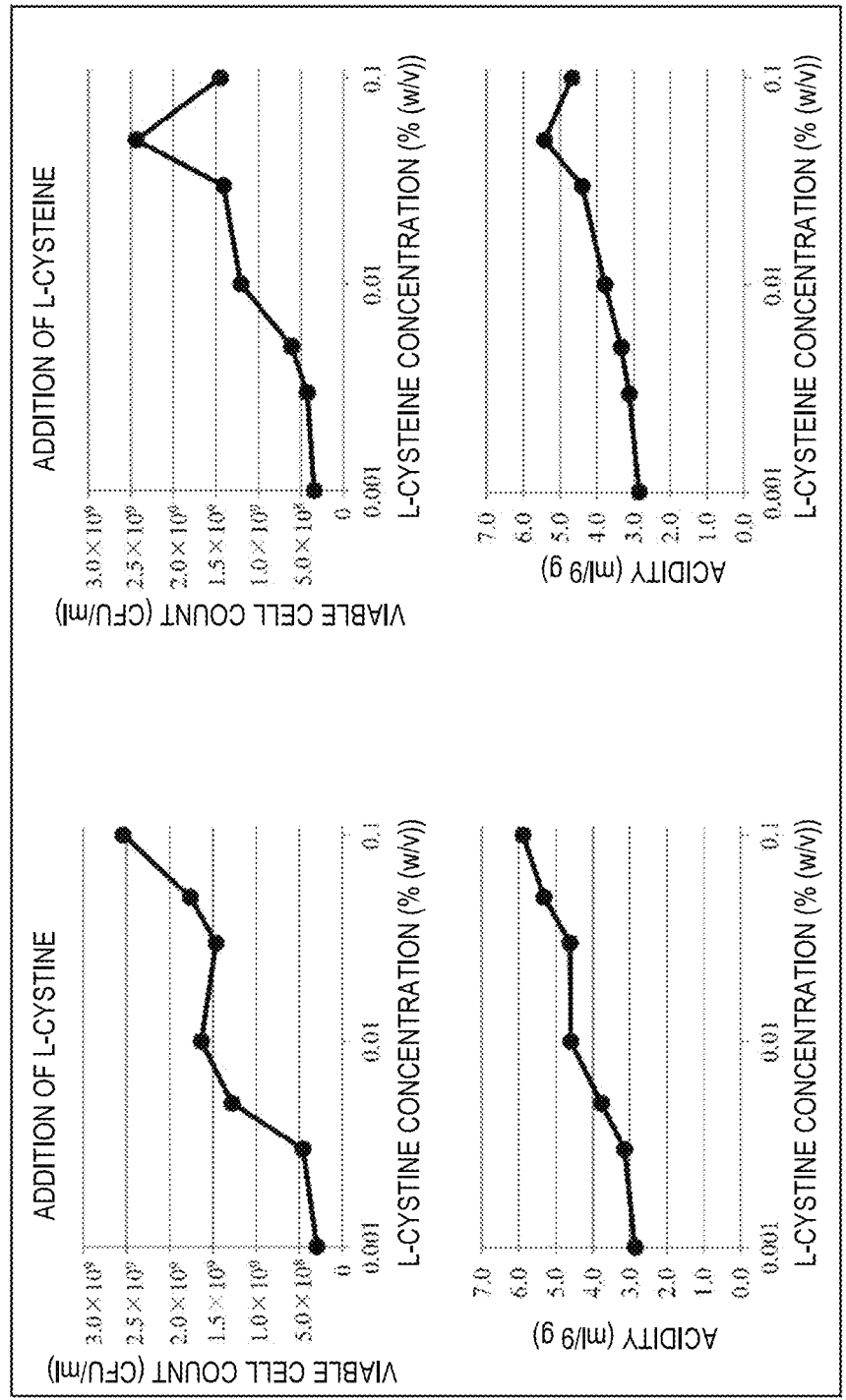
FIG. 5 is graphs showing differences in the culture state of *Bifidobacterium bifidum* YIT 10347 (BF-1) due to differences in the concentration of L-cystine or L-cysteine hydrochloride added to a skimmed milk culture medium.
Figure 6:
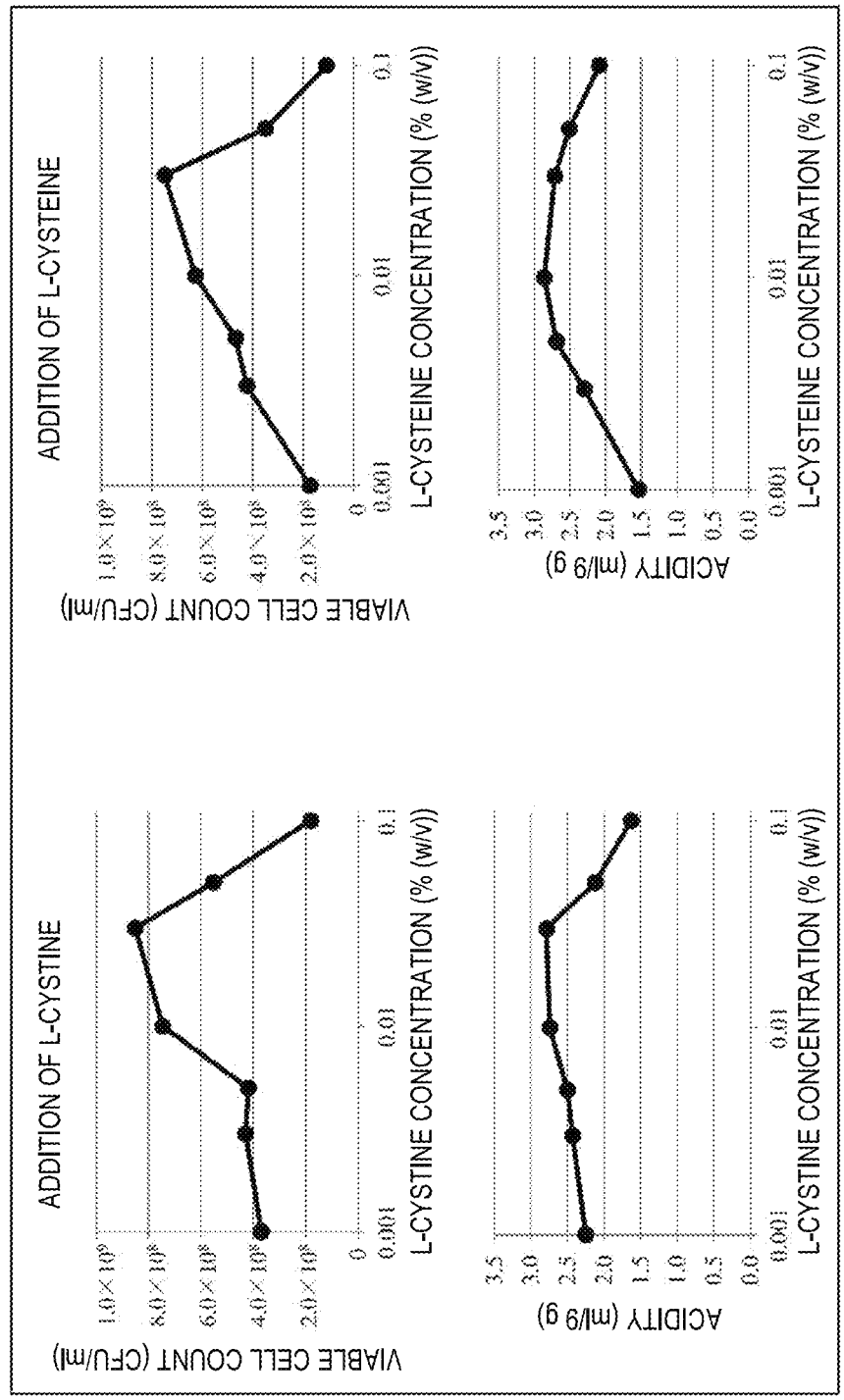
FIG. 6 is graphs showing differences in the culture state of BF-1 due to differences in the concentration of L-cystine or L-cysteine hydrochloride added to a whey culture medium.

FIGS. 3 to 6 show acidities and viable cell counts of BbY and BF-1 when the final concentration of L-cystine or L-cysteine added to the skimmed milk culture medium or the whey culture medium separated before heating was varied. FIG. 3 shows the results when BbY was cultured in the skimmed milk culture medium, FIG. 4 shows the results when BbY was cultured in the whey culture medium, FIG. 5 shows the results when BF-1 was cultured in the skimmed milk culture medium, and FIG. 6 shows the results when BF-1 was cultured in the whey culture medium. It should be noted that although it is not shown in FIGS. 3 to 6, the viable cell count and the acidity when neither L-cystine nor L-cysteine was added were respectively $5.67 \times 10^8$ CFU/mL and 2.48 mL/9 g when BbY was cultured in the skimmed milk culture medium, $7.42 \times 10^7$ CFU/mL and 1.05 mL/9 g when BbY was cultured in the whey culture medium, $3.81 \times 10^8$ CFU/mL and 2.53 mL/9 g when BF-1 was cultured in the skimmed milk culture medium, and $5.59 \times 10^7$ CFU/mL and 1.21 mL/9 g when BF-1 was cultured in the whey culture medium.

Whey is a component that is obtained by removing casein from skimmed milk and includes water-soluble ingredients of skimmed milk, such as whey proteins, lactose, and minerals. Whey was separated as the supernatant by adjusting the pH of skimmed milk to 4.6, and was used for culture after readjustment to pH 6.5.

In both results of the culture of BbY and BF-1, the viable cell count and the acidity were increased by using a simultaneous heating culture medium containing L-cystine or L-cysteine, compared to those when a culture medium not containing L-cystine and L-cysteine was used.

For BbY, in both the skimmed milk culture medium and the whey culture medium, the viable cell count was maximum in the simultaneous heating culture medium at an L-cystine concentration of 0.01% (w/v). In addition, the L-cysteine concentration at which the viable cell count was maximum in the simultaneous heating culture medium was 0.03% (w/v) in the milk culture medium and 0.01% (w/v) in the whey culture medium.

For BF-1, the viable cell count in the simultaneous heating culture medium was maximum at an L-cystine concentration of 0.1% (w/v) in the skimmed milk culture medium and at an L-cystine concentration of 0.03% (w/v) in the whey culture medium. In addition, the L-cysteine concentration at which the viable cell count was maximum in the simultaneous heating culture medium was 0.05% (w/v) in the skimmed milk culture medium and was 0.03% (w/v) in the whey culture medium.

Figure 7:
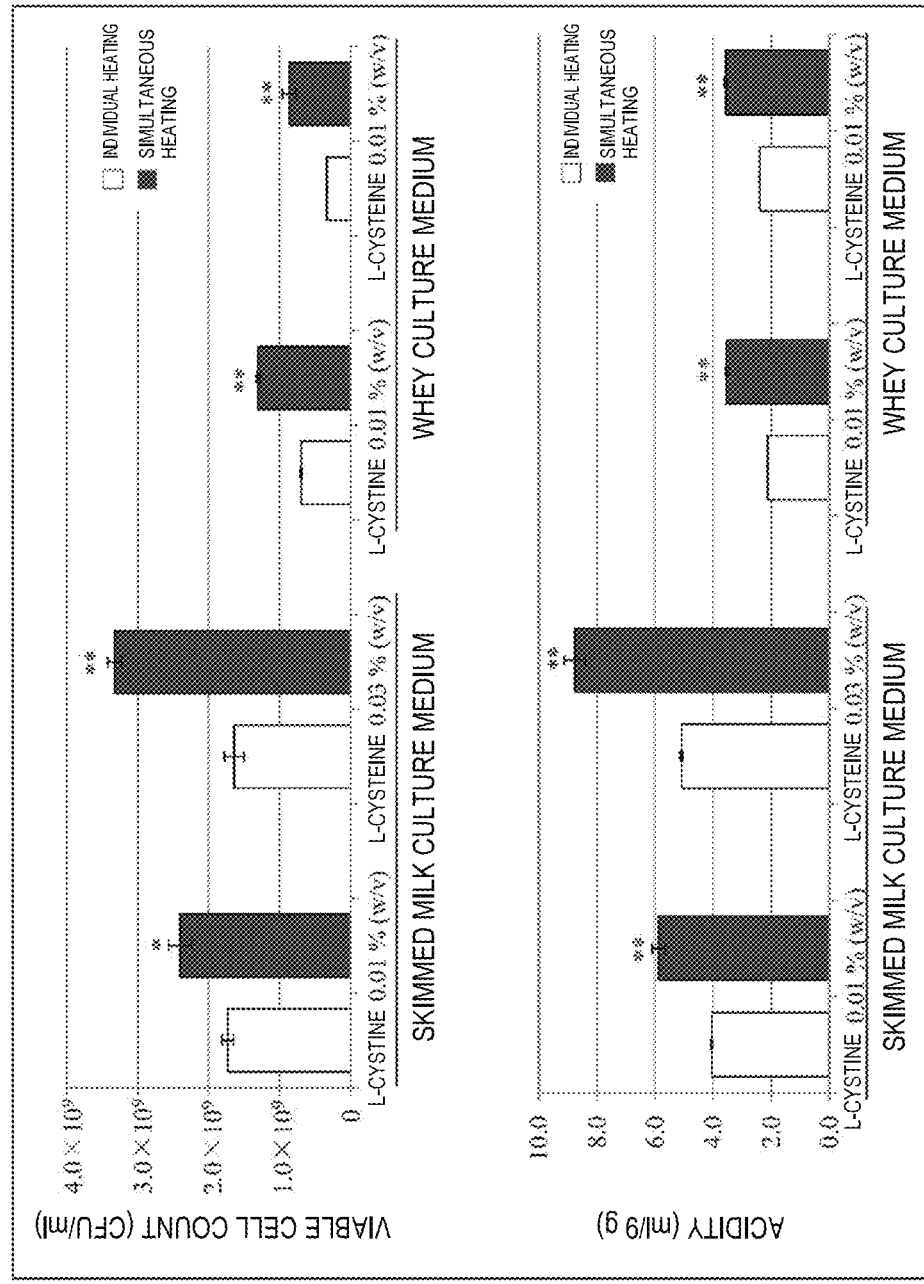
FIG. 7 is graphs showing the culture state of BbY at the L-cystine or L-cysteine hydrochloride concentration giving the maximum viable cell count.
Figure 8:
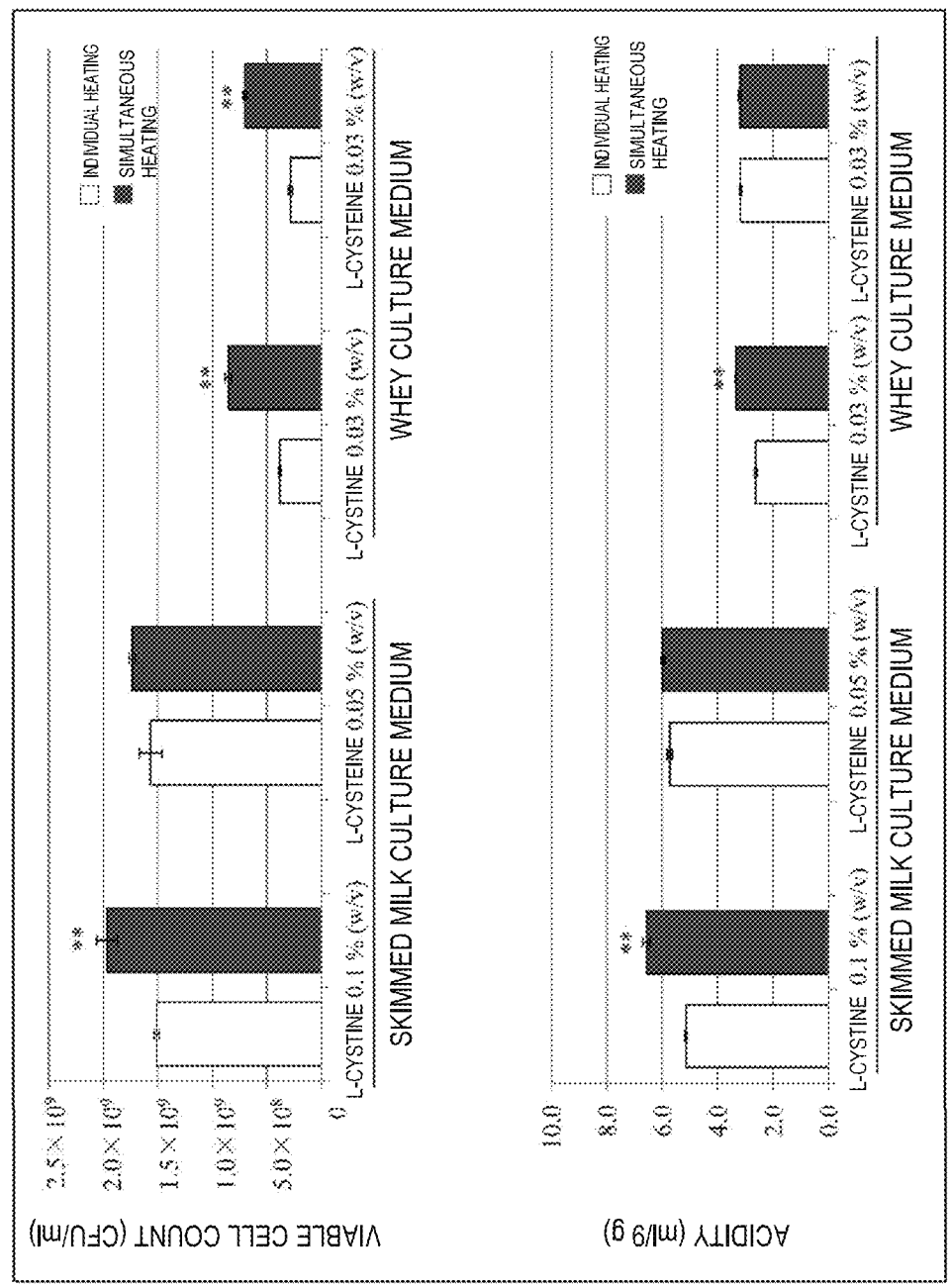
FIG. 8 is graphs showing the culture state of BF-1 at the L-cystine or L-cysteine hydrochloride concentration giving the maximum viable cell count.

The above-described concentrations at which the viable cell count was maximum were compared between the individual heating culture medium and the simultaneous heating culture medium at n=3 each. As shown in FIG. 7 (BbY) and FIG. 8 (BF-1), regardless of the bacterial strain and the additive, the viable cell count and the acidity were higher in the simultaneous heating compared to those in the individual heating. In particular, it was observed that when BbY was cultured in a skimmed milk culture medium or whey culture medium containing L-cystine or L-cysteine and when BF-1 was cultured in a skimmed milk culture medium containing L-cystine or a whey culture medium containing L-cystine or L-cysteine, the viable cell count was significantly increased 1.3 to 2.6 times by simultaneous heating, compared to individual heating.

The results above suggest that milk and L-cystine or L-cysteine react with each other by heating to generate any growth-promoting factor.

Example 3: Variation in Growth-Promoting Action by Whey Separated from Skimmed Milk Before or After Heating and Timing of Addition of Cysteine (1) Test Bacterial Strain
BbY was used.
(2) Preparation of Culture Medium
(i) Whey Culture Medium Separated Before Heating As in Example 2, whey separated before heating and simultaneous heating culture media with L-cysteine was prepared. In addition, a culture medium in which L-cysteine was added after heat sterilization and immediately before inoculation (individual heating culture medium) was also prepared. The addition concentration of L-cysteine was 0.03 (w/v) % as the final concentration.

(ii) Whey Culture Medium Separated After Heating

A skimmed milk powder was dissolved in RO water at 12% (w/v), and the 12% (w/v) skimmed milk was sterilized by heat in an autoclave at 115° C. for 30 minutes in anaerobic conditions by nitrogen gas and was then adjusted to a pH of 4.6 with 5 N HCl, followed by centrifugation at 3,000×g for 5 minutes. Subsequently, the supernatant was adjusted to a pH of 6.5 with 5 N NaOH and was centrifuged at 10,000×g for 15 to 30 minutes. The supernatant was dispensed in 10 mL aliquots in a pre-sterilized rimmed medium-sized test tube while replacing the headspace with nitrogen gas and sealed with a butyl rubber stopper to provide a whey culture medium separated after heating. In addition, as in the skimmed milk culture media of Example 1, in anaerobic conditions, a culture medium in which L-cysteine was added before heating and then heat sterilization was performed (simultaneous heating culture medium) and a culture medium in which addition was performed after heat sterilization and before adjustment to pH 4.6 (individual heating culture medium) were also prepared.

(3) Inoculation and Culture Conditions

Inoculation and culture were performed as in Example 1.
(4) Method for Measuring Various Parameters The (i) pH, (ii) acidity, and (iii) viable cell count were measured as in Example 1.
(iv) Viable Cell Count Ratio Based on the viable cell counts in (iii), each viable cell count ratio was calculated by dividing the viable cell count in the simultaneous heating culture medium by the viable cell count in the individual heating culture medium.
(5) Results The results are shown in Table 2 below.

TABLE 2

| | | Culture time 9 h | | | | Culture time 12 h | | | |
|---|---|---|---|---|---|---|---|---|---|
| Sample | L-cysteine addition method | pH | Acidity (ml/9 g) | Viable cell count (CFU/ml) | Viable cell count ratio (simultaneous/ individual) | pH | Acidity (ml/9 g) | Viable cell count (CFU/ml) | Viable cell count ratio (simultaneous/ individual) |
| Whey separated before heating | No addition | 5.32 | 1.40 | $3.97 \times 10^7$ | 2.04 | 5.28 | 1.50 | $2.75 \times 10^7$ | 2.31 |
| | Simultaneous heating | 5.01 | 2.15 | $2.53 \times 10^8$ | | 4.85 | 2.29 | $3.29 \times 10^8$ | |
| | Individual heating | 4.97 | 2.15 | $1.24 \times 10^8$ | | 4.82 | 2.55 | $1.42 \times 10^8$ | |
| Whey separated after | No addition | 6.07 | 1.65 | $8.13 \times 10^7$ | 1.45 | 5.96 | 1.87 | $1.36 \times 10^8$ | 1.68 |
| | Simultaneous heating | 4.85 | 4.23 | $1.29 \times 10^9$ | | 4.32 | 7.28 | $2.22 \times 10^9$ | |

TABLE 2-continued

| | | Culture time 9 h | | | | Culture time 12 h | | | |
|---|---|---|---|---|---|---|---|---|---|
| Sample | L-cysteine addition method | pH | Acidity (ml/9 g) | Viable cell count (CFU/ml) | Viable cell count ratio (simultaneous/ individual) | pH | Acidity (ml/9 g) | Viable cell count (CFU/ml) | Viable cell count ratio (simultaneous/ individual) |
| heating | Individual heating | 5.14 | 3.43 | $8.89 \times 10^8$ | | 4.81 | 4.78 | $1.32 \times 10^9$ | |

Promotion of growth of BbY by addition of L-cysteine was observed both when casein was removed before heating (whey culture medium separated before heating) and when heating was performed in the state containing casein and casein was removed after heating (whey culture medium separated after heating). In addition, in both cases, although the viable cell count in the simultaneous heating culture medium was higher than the viable cell count in the individual heating culture medium, the viable cell count ratio between the simultaneous heating culture medium and the individual heating culture medium was higher in the whey culture medium separated before heating. Accordingly, it is likely that whey is deeply involved in the growth-promoting factor than casein.

Example 4: Variation in Growth-Promoting Action by Temperature of Simultaneous Heating of Milk and L-Cystine (1) Test Bacterial Strain
BbY was used.
(2) Preparation of Culture Medium
(i) Skimmed Milk Culture Medium
A skimmed milk culture medium along with a simultaneous heating culture medium and an individual heating culture medium with the addition of L-cystine were prepared as in Example 1 except for the heating temperature and the addition concentration of L-cystine. The heating was performed at 115° C. for 30 minutes or at 121° C. for 30 minutes. L-Cystine was added before or after heating such that the final concentration was 0.03% (w/v).
(3) Inoculation and Culture Conditions
Inoculation and culture were performed as in Example 1.
(4) Method for Measuring Various Parameters
The (i) pH, (ii) acidity, and (iii) viable cell count were measured as in Example 1.
(5) Results
The results are shown in Table 3 below.

TABLE 3

| Heating conditions | Timing of cystine addition | pH | Acidity (mL/9 g) | Viable cell count (CFU/mL) |
|---|---|---|---|---|
| 115° C. for 30 min | No addition | 5.90 | 2.44 | $3.62 \times 10^8$ |
| | After heat sterilization (individual heating) | 5.34 | 3.82 | $1.29 \times 10^9$ |
| | Before heat sterilization (simultaneous heating) | 5.00 | 5.40 | $1.89 \times 10^9$ |
| 121° C. for 30 min | No addition | 5.69 | 2.77 | $3.05 \times 10^8$ |
| | After heat sterilization (individual heating) | 5.26 | 4.00 | $1.12 \times 10^9$ |
| | Before heat sterilization (simultaneous heating) | 4.96 | 5.42 | $1.86 \times 10^9$ |

Promotion of growth of BbY by addition of L-cystine was also observed at any heating temperature. In addition, at any heating temperature, when skimmed milk and L-cystine were simultaneously heated, increases in the viable cell count and the acidity were observed, compared to when skimmed milk and L-cystine were individually heated.

Example 5: Exploration for Growth-Promoting Factor

The results of Examples 1 to 4 suggest that milk and L-cystine or L-cysteine react with each other by heating to generate a growth-promoting factor. In addition, it is likely that an ingredient included in the whey of milk is involved in the generation of the growth-promoting factor. Accordingly, exploration for the growth-promoting factor was performed.

(1) Method
L-Cysteine hydrochloride was added to a whey culture medium separated before heating at a final concentration of 0.03% (w/v), followed by heating at 115° C. for 30 minutes. The resulting heat-treated product was adjusted to a pH of 8.0 with 5 N NaOH and was centrifuged at 13,000×g for 30 minutes. The supernatant was applied to an ultrafiltration filter Amicon Ultra-15 3 kDa (manufactured by Merck KGaA), followed by centrifugation at 5,000×g for 60 minutes. The filtrate (fraction with a molecular weight of less than 3,000) was subjected to liquid chromatography (mobile phase: Tris buffer solution) using an anion exchange column under the following conditions:

Column: HiTrap Q FF 1 mL;
Starting buffer: 20 mM Tris buffer solution (pH 8.0);
Elution buffer: 20 mM Tris buffer solution (pH 8.0) containing 1 M NaCl;
Elution method: Flowthrough 20 CV, Gradient (0→100%, 20 CV), 2 mL/fraction, wash (100%, 5 CV);
Application method: Direct sample load 10 mL;
Flow rate: 1 mL/min;
Column temperature: room temperature; and
Equipment: AKTA explorer (GE Healthcare).

1 mL of each of the resulting fractions was added to 9 mL of the same skimmed milk culture medium as in Example 1 that had been subjected to heat treatment at 115° C. for 30 minutes, and BbY was inoculated thereto (simultaneous heating sample). The viable cell count and the acidity after culturing at 37° C. for 12 hours were measured as in Example 1.

In addition, the same procedure as above was performed on the whey culture medium separated before heating which was subjected to heat treatment at 115° C. for 30 minutes without additives, and subsequently supplemented with L-cysteine at a final concentration of 0.03% (w/v) (individual heating sample). As a control, 1 mL of a Tris buffer solution was added to a skimmed milk culture medium, and BbY was cultured.

(2) Results

Figure 9:
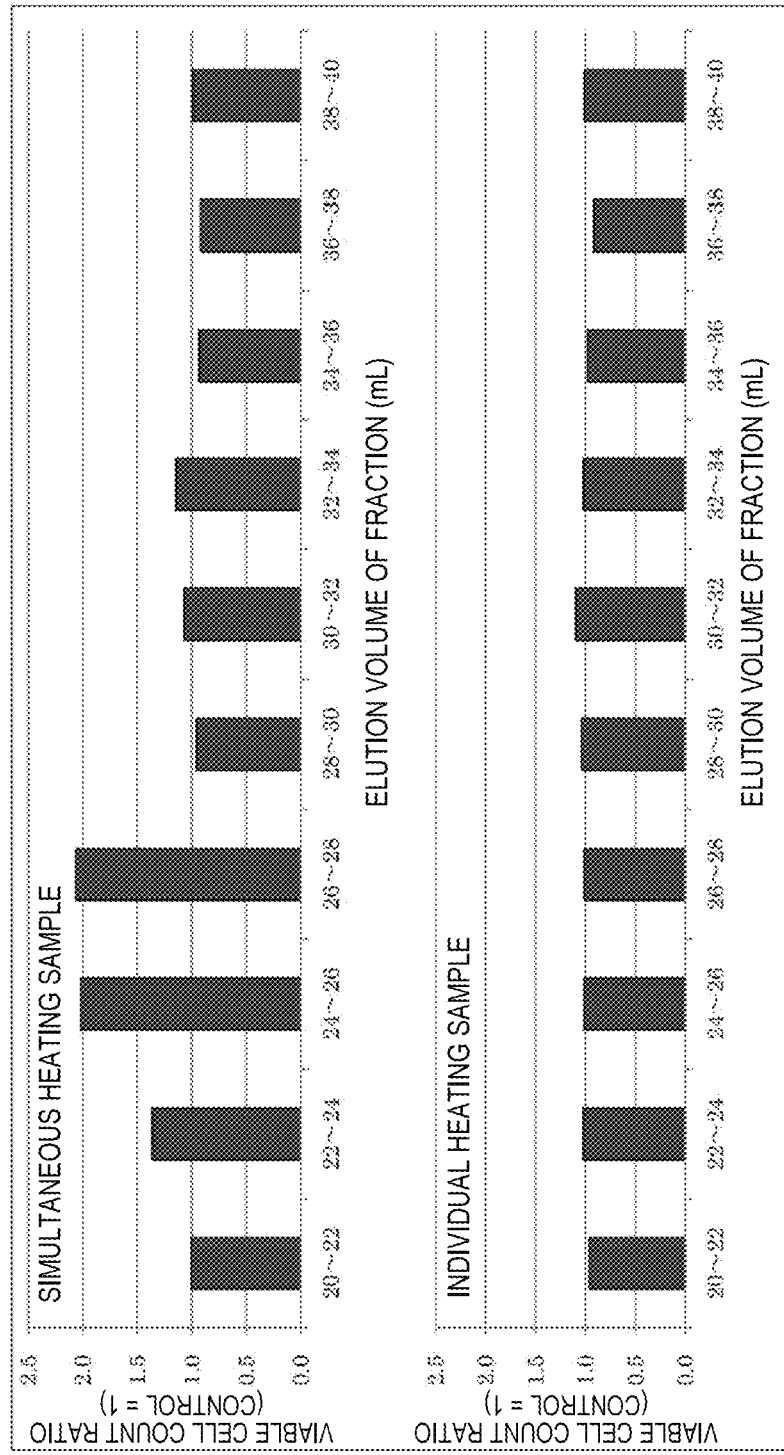
FIG. 9 is graphs showing the viable cell counts of each fraction of a simultaneous heating sample (the upper graph) and an individual heating sample (the lower graph). The vertical axis indicates the viable cell count ratio of each fraction when the viable cell count of a control sample is defined as 1, and the horizontal axis indicates the elution volume.
Figure 10:
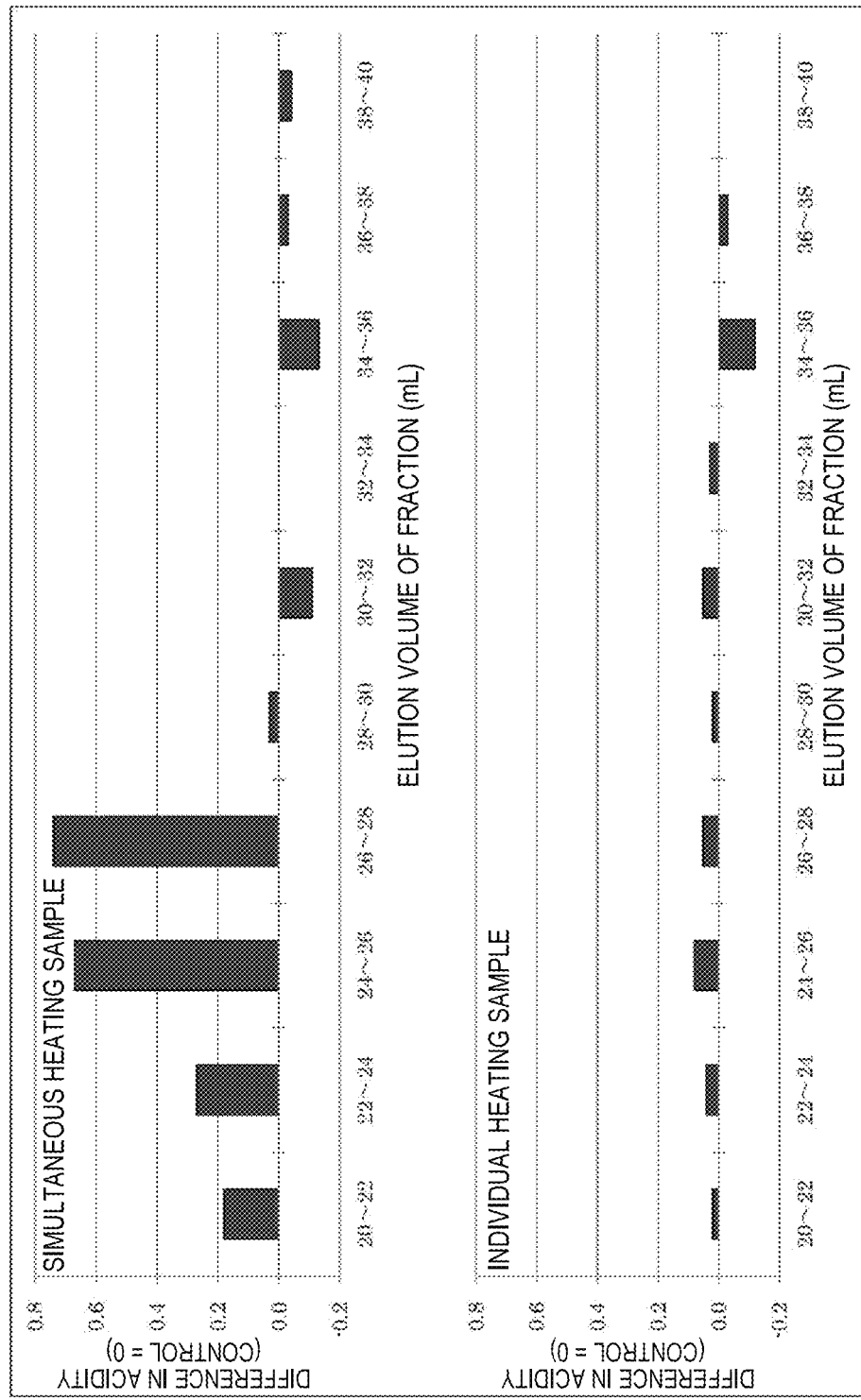
FIG. 10 is graphs showing the acidities of each fraction of a simultaneous heating sample (the upper graph) and an individual heating sample (the lower graph). The vertical axis indicates the difference in acidity of each fraction when the acidity of a control sample is defined as 0, and the horizontal axis indicates the elution volume.

FIG. 9 shows the viable cell count ratios in each fraction when the viable cell count of the control sample ($5.5 \times 10^8$ CFU/mL) was defined as 1, and FIG. 10 shows the difference in the acidity of each fraction when the acidity of the control sample was defined as 0. In the simultaneous heating sample, the growth-promoting effect was observed particularly in the fraction with an elution volume of about 22 to 28 mL. On the other hand, in the individual heating sample, no fraction having the growth-promoting effect was observed. The fraction with an elution volume of 22 to 28 mL corresponds to the fraction that is eluted in the presence of 50 to 200 mM anions.

The same results were also obtained when BF-1 was used as the bacteria of the genus *Bifidobacterium*.

Accordingly, it was revealed that the growth-promoting factor for bacteria of the genus *Bifidobacterium* is a component having a molecular weight of less than 3,000 in the heat-treated product of a milk culture medium containing cysteine, cystine, or a salt thereof, in particular, L-cysteine hydrochloride, and is a milk culture medium component retained on an anion exchange resin at a pH of 8.0 or higher and eluted from the anion exchange resin in the presence of 50 to 200 mM anions.

The invention claimed is:

1. A method for producing a heat-treated product, comprising:
   adding to milk at least one amino acid selected from cysteine, cystine, and salts thereof such that a milk culture medium is formed, wherein the final concentration of the at least one amino acid is 0.001 to 0.1 (w/v) %; and
   subjecting the milk culture medium to heat treatment such that the heat-treated product is formed, wherein the heat treatment is performed in a temperature range of 115 to 121° C. for 20 to 30 minutes.

2. The method according to claim 1, wherein the at least one amino acid is selected from L-cysteine, L-cystine, and salts thereof.

3. The method according to claim 1, wherein the at least one amino acid is L-cysteine hydrochloride.

4. A method for producing fermented milk, comprising:
   providing a heat-treated product made by the method of claim 1; and
   culturing bacteria of the genus *Bifidobacterium* in the heat-treated product to produce fermented milk.

5. Fermented milk made by the method of claim 4.

6. A growth-promoting agent for bacteria of the genus *Bifidobacterium*, comprising:
   a heat-treated product made by the method of claim 1.

7. The growth-promoting agent according to claim 6, wherein the at least one amino acid is selected from L-cysteine, L-cystine, and salts thereof.

8. The growth-promoting agent according to claim 6, wherein the at least one amino acid is L-cysteine hydrochloride.

9. A method for producing a milk culture medium component, comprising:
   producing a heat-treated product using the method of claim 1;
   isolating components having molecular weights of less than 3,000 from the resulting heat-treated product;
   allowing the obtained components to be retained on an anion resin at a pH of 8.0 or higher; and
   eluting a component retained on the anion resin in the presence of 1 to 400 mM anions.

10. A method for producing fermented milk, comprising:
    providing a heat-treated product made by the method of claim 3; and
    culturing bacteria of the genus *Bifidobacterium* in the heat-treated product to produce fermented milk.

11. Fermented milk made by the method of claim 10.

12. A milk culture medium component produced by the method of claim 9.

13. A method for producing a milk culture medium component, comprising:
    producing a heat-treated product using the method of claim 3;
    isolating components having molecular weights of less than 3,000 from the resulting heat-treated product;
    allowing the obtained components to be retained on an anion resin at a pH of 8.0 or higher; and
    eluting a component retained on the anion resin in the presence of 1 to 400 mM anions.

14. A milk culture medium component produced by the method of claim 13.

* * * * *